US007818743B2

(12) United States Patent
Branda et al.

(10) Patent No.: US 7,818,743 B2
(45) Date of Patent: Oct. 19, 2010

(54) LOGGING LOCK DATA

(75) Inventors: Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 11/232,750

(22) Filed: Sep. 22, 2005

(65) Prior Publication Data

US 2007/0067777 A1   Mar. 22, 2007

(51) Int. Cl.
*G06F 9/46* (2006.01)
(52) U.S. Cl. ............................ 718/100; 718/102
(58) Field of Classification Search .............. 718/100
See application file for complete search history.

(56) References Cited

U.S. PATENT DOCUMENTS 6,728,959 B1 * 4/2004 Merkey ................... 718/102
6,941,360 B1 * 9/2005 Srivastava et al. ........... 709/223
7,003,521 B2 * 2/2006 Long ............................. 707/8
7,051,026 B2 * 5/2006 Berry et al. .................. 707/8
2003/0114949 A1 * 6/2003 Armstrong et al. ......... 700/107
2005/0198215 A1 * 9/2005 Helmerich ................. 709/220
2006/0143608 A1 * 6/2006 Dostert et al. ................ 718/1

* cited by examiner

*Primary Examiner*—Meng-Ai An
*Assistant Examiner*—Gregory A Kessler
(74) *Attorney, Agent, or Firm*—Owen J. Gamon

(57) ABSTRACT

A method, apparatus, system, and signal-bearing medium that, in an embodiment, wait for expiration of a poll interval and in response to expiration of the poll interval, retrieve data regarding locks on objects and store the data in a log. In an embodiment, the stored data may include an identifier of the lock, a name of a class from which the threads were instantiated, a number of the threads, and a thread stack. The threads are waiting on the locks, and the lock wait times for the threads are calculated and stored in the log. The lock wait time is the time that the respective thread has waited on the lock. If any of the lock wait times exceeds a threshold, an identifier of the thread associated with the lock wait time that exceeds the threshold is stored in the log.

10 Claims, 5 Drawing Sheets

LOG 162

| LOCK ID | CLASS FILE NAME | LOCK DEPTH | THREAD STACK | LOCK WAIT TIMES | THREADS THAT EXCEED WAIT THRESHOLD | |
|---|---|---|---|---|---|---|
| LOCK A | CLASS N | 3 | H, I, Z | 3, 1, 2 | THREAD H | 405 |
| LOCK F | CLASS O | 4 | Q, R, S, T | 1, 1, 3, 2 | THREAD S | 410 |
| LOCK Z | CLASS P | 2 | L, M | 1, 3 | TREAD M | 415 |

LOGGING LOCK DATA

FIELD

This invention generally relates to computer systems and more specifically relates to logging data regarding locks.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems, kernels, and virtual machines have been developed, which permit computer programs to concurrently execute in multiple threads, so that multiple tasks can essentially be performed at the same time.

A thread is an execution path of instructions or statements. If multiple threads need to use the same object concurrently, a virtual machine manages access of the threads to objects via locks, in order to prevent interference and unpredictable behavior. A lock is a privilege to access an object that only one thread may possess at any one time. If a thread desires to lock a particular object, the thread requests a lock from the virtual machine. The virtual machine is a program that interprets an/or compiles the threads for execution on a processor.

One such multi-threaded system implemented as a virtual machine is JVM (Java Virtual Machine). A problem with building scalable Java applications is the limited tooling options available to give developers, testers, and production administrators the ability to understand how their multi-threaded applications contend for locks inside of the JVM. These tool options are needed to debug problems or aid in analysis of the application as it is being built.

Currently, the following techniques are used for gathering lock contention data from multi-threaded applications: manual analysis of thread dumps, profilers, and traces. A manual analysis of thread dumps can cause instability in the JVM and halt all operations inside of the JDK (Java Development Kit) when the thread dump occurs for as long as the thread dump executes, making it unrealistic for a production environment. A JVMPI (Java Virtual Machine Profiler Interface) profiler adds instrumentation code to threads, in order to give the user a view of whether the threads are waiting and for which locks the threads are waiting, but profilers pay a performance penalty because of the additional instrumentation code, which make them unrealistic for a production environment. A Java Lock Monitor trace, which is a profile of which locks are most highly contended during a period of time that the profiler is connected, also has the effect of attaching a JVMPI profiler and resultant instrumentation code, which again slows down the runtime significantly enough to make it unrealistic for a production environment.

Thus, what is needed is a better way to gather lock contention data for multi-threaded applications.

SUMMARY

A method, apparatus, system, and signal-bearing medium are provided that, in an embodiment, wait for expiration of a poll interval and in response to expiration of the poll interval, retrieve data regarding locks on objects and store the data in a log. In an embodiment, the stored data may include an identifier of the lock, a name of a class from which the threads were instantiated, a number of the threads, and a thread stack. The threads are waiting on the locks, and the lock wait times for the threads are calculated and stored in the log. The lock wait time is the time that the respective thread has waited on the lock. If any of the lock wait times exceeds a threshold, an identifier of the thread associated with the lock wait time that exceeds the threshold is stored in the log.

BRIEF DESCRIPTION OF THE DRAWINGS

Various embodiments of the present invention are hereinafter described in conjunction with the appended drawings:

FIG. 4 depicts a block diagram of an example data structure for a log, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
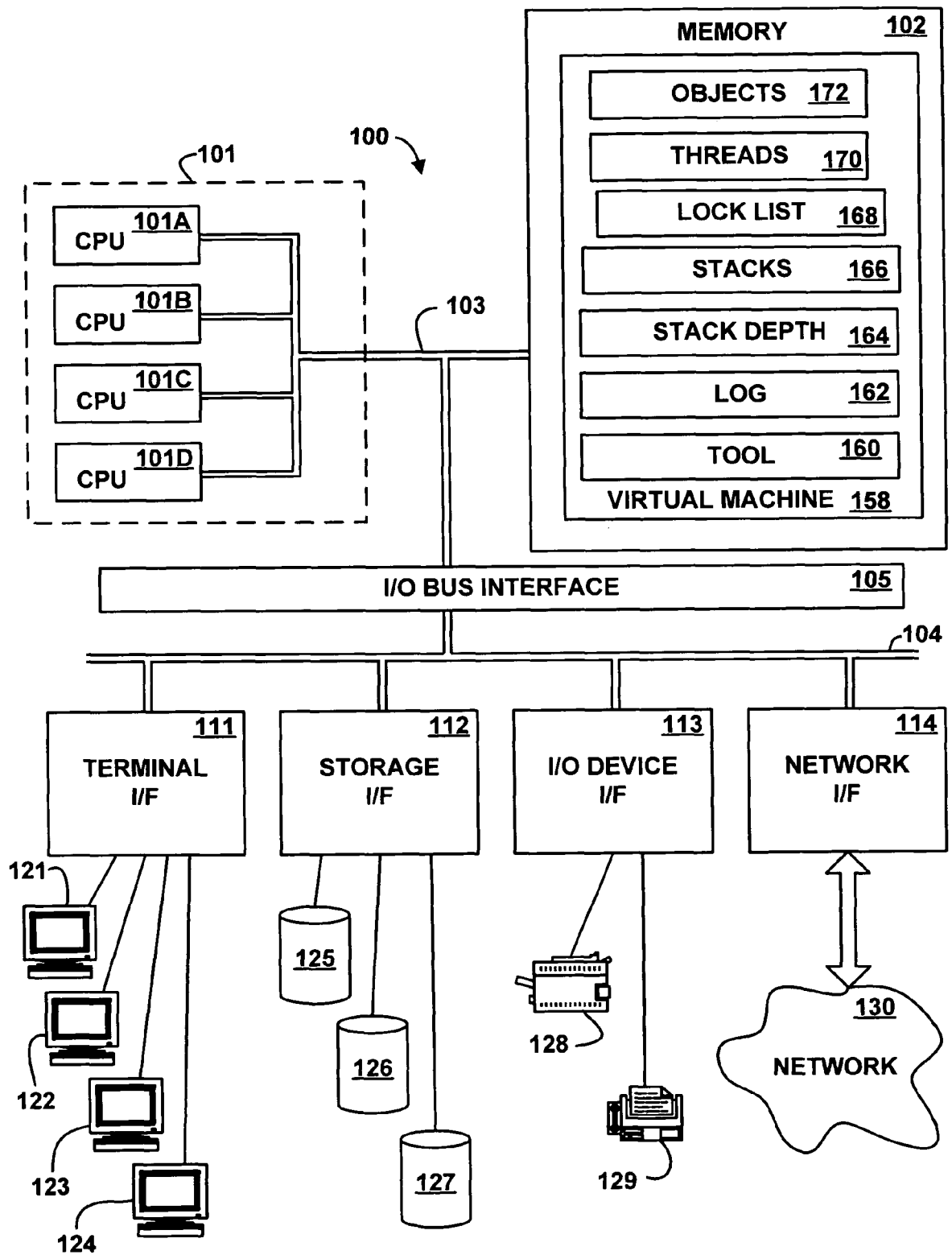
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a virtual machine 158, which includes a tool 160, a log 162, a stack depth 164, stacks 166, a lock list 168, threads 170, and objects 172. Although the virtual machine 158 is illustrated as containing the tool 160, the log 162, the stack depth 164, the stacks 166, the lock list 168, the threads 170, and the objects 172, in other embodiments any of them may be packaged differently. Thus, although the tool 160, the log 162, the stack depth 164, the stacks 166, the lock list 168, the threads 170, and the objects 172 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the tool 160, the log 162, the stack depth 164, the stacks 166, the lock list 168, the threads 170, and the objects 172 are illustrated as being contained within the main memory 102, these elements are not necessarily all completely contained in the same storage device at the same time. Further, although the tool 160, the log 162, the stack depth 164, the stacks 166, the lock list 168, the threads 170, and the objects 172 are illustrated as being separate entities, in other embodiments some of them, or portions of some of them, may be packaged together.

The virtual machine 158 interprets or compiles (or any combination thereof) the threads 170 for execution on the processor 101. The virtual machine 158 further locks and unlocks the objects 172 in response to requests from the threads 170 and updates the information in the stack depths 164, the stacks 166, and the lock list 168 based on the lock and unlock requests. The virtual machine 158 may be implemented based on an enhanced Java Virtual Machine (JVM), but in other embodiments any appropriate virtual machine may be used as a basis for enhancement by an embodiment of the invention. Although the tool 160 is illustrated as being contained in the virtual machine 158 and is, in an embodiment, a part of the virtual machine 158, in another embodiment the tool 160 is separate from and interfaces to the virtual machine 158.

The threads 170 are execution paths of instructions or statements that are capable of possessing locks and/or waiting on locks of the objects 172. In an embodiment, a thread 170 is a single sequence of instructions, which may be executed by the processor 101 in parallel with other sequences, either by time slicing or multiprocessing. In another embodiment, a thread 170 is synonymous with a process or a task. In another embodiment, a thread 170 is different from a process in that processes are independent, include state information, have separate address spaces, and interact through system-provided inter-process communication mechanisms, while threads are a technique for splitting a program into two or more simultaneously running tasks, where the threads share the state information of a single process and share memory and other resources directly. In various embodiments, the threads 170 may be implemented via preemptive multithreading, cooperative multithreading, or any other type of multithreading. Preemptive multithreading allows the operating system to determine when a context switch should occur. Cooperative multithreading, on the other hand, relies on the threads themselves to relinquish control once they are at a stopping point.

If multiple threads 170 need to use the same object 172 concurrently, the virtual machine 158 manages access of the threads 170 to the object 172 via locks, in order to prevent interference and unpredictable behavior. A lock is a privilege to access the object 172 that only one thread 170 can possess at any one time. If a thread 170 desires to lock a particular object 172, the thread 170 requests a lock from the virtual machine 158. At some point after the thread 170 asks the virtual machine 158 for a lock—perhaps soon, perhaps later, possibly never—the virtual machine 158 gives the lock to the thread 170. When the thread 170 no longer needs the lock, it returns the lock to the virtual machine 158, after which the virtual machine 158 may pass the lock to another, waiting, thread. When an object 172 is locked by a thread, no other thread can access or modify the object 172 until the locking thread releases it. The thread 170 need not obtain a lock to access an object 172 if that object 172 is not already locked; but, if a thread 170 does obtain a lock on an object 172, no other thread can access the locked object 172 until the thread 170 that owns the lock releases it. Thus, execution of a thread 170 that is waiting on a lock is halted until the lock is released.

The tool 160 periodically retrieves data regarding the locks that the threads 170 have on the objects 172 and stores the data in the log 162. The tool 160 retrieves the data from the stack depth 164, the stacks 166, and the lock list 168. The tool 160 may include instructions capable of executing on the processor 101 or statements capable of being interpreted by instructions executing on the processor 101 to perform the functions as further described below with reference to FIGS. 5 and 6. In another embodiment, the tool 160 may be implemented in microcode or firmware. In another embodiment, the tool 160 may be implemented in hardware via logic gates and/or other appropriate hardware techniques in lieu of or in addition to a processor-based system.

The stacks 166 store information about the threads 170 (and their functions, subroutines, procedures, methods, and/or classes) that are currently being executed by the processor 101 and that are waiting on a lock of the objects 172. In an embodiment, waiting on a lock means waiting to obtain a lock on an object 172. In another embodiment, waiting on a lock means waiting to access the object 172, regardless of whether the thread 170 that is waiting wishes to obtain a lock on the object 172. The stacks 166 are further described below with reference to FIG. 3.

The stack depth 164 indicates the number of entries in the respective stacks 166, i.e., the number of the threads 170 that are waiting on a lock of an object 172. The stack depth 164 is further described below with reference to FIG. 2.

The lock list 168 includes information about locks on the objects 172 for which the threads 170 are waiting. The lock list 168 is further described below with reference to FIG. 2. In various embodiments, the objects 172 may be implemented by a hash table, a thread pool, a shared data structure, or any other appropriate object that is capable of being locked. The log 162 stores collected data about the locks, the stack depths 164, the stacks 166, the lock lists 168, the threads 170, and the objects 172. The log 162 is further described below with reference to FIG. 4.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interfaces 113 provide an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3× specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100, via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

The tangible signal-bearing media may be operatively and communicatively connected (directly or indirectly) to a processing unit, such as the processor 101. Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
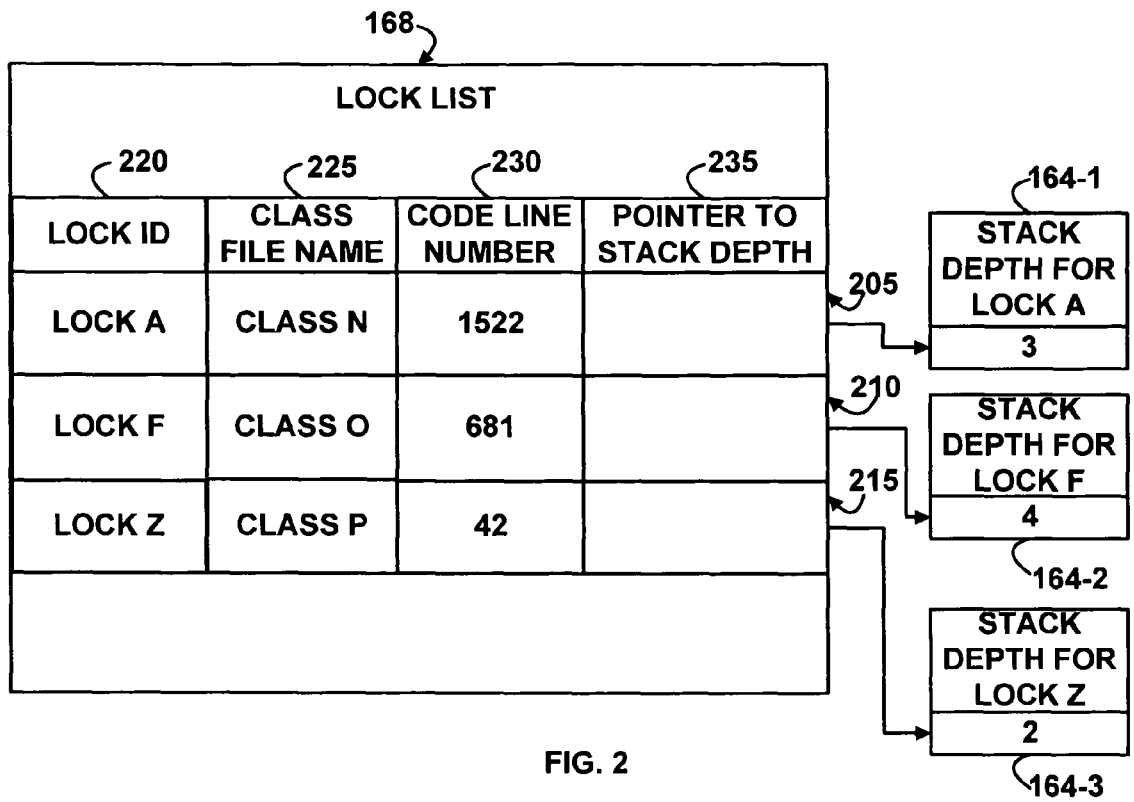
FIG. 2 depicts a block diagram of example data structures for a lock list and stack depths, according to an embodiment of the invention.

FIG. 2 depicts a block diagram of example data structures for a lock list 168 and stack depths 164-1, 164-2, and 164-3, which are generically referred to as the stack depth 164 (FIG. 1), according to an embodiment of the invention. The lock list 168 includes records 205, 210, and 215, but in other embodiments any number of records with any appropriate data may be present. Each of the records 205, 210, and 215 includes a lock identifier field 220, a class file name field 225, a code line number field 230, and a pointer to the stack depth field 235, but in other embodiments more or fewer fields may be present.

The lock identifier field 220 identifies locks that the threads 170 associated with the class 225 at the code line number 230 have on the objects 172. The class file name field 225 identifies or names a class that is instantiated as an object or objects that execute on the processor 101 as the threads 170. The code line number field 230 identifies a location or line number within the threads 170 where the lock on the object 172 occurs. The pointer to the stack depth field 235 includes an address of the stack depth 164 (FIG. 1), such as the example stack depths 164-1, 164-2, and 164-3.

Figure 3:
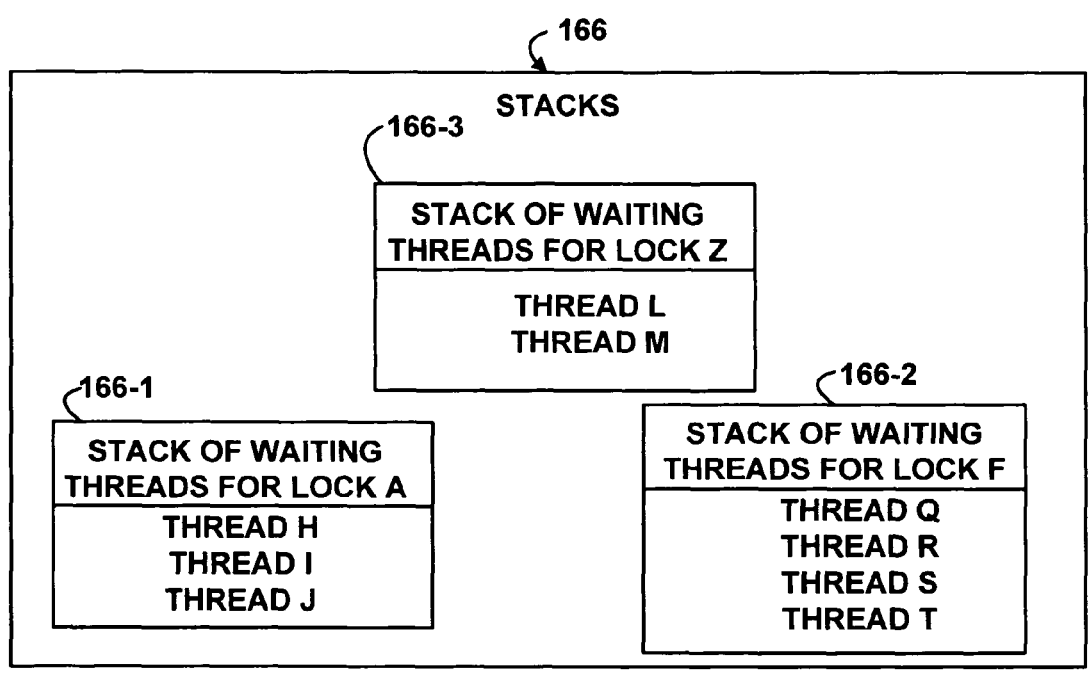
FIG. 3 depicts a block diagram of an example data structure for stacks, according to an embodiment of the invention.

FIG. 3 depicts a block diagram of an example data structure for the stacks 166, according to an embodiment of the invention. The stacks 166 include example stacks 166-1, 166-2, and 166-3, but in other embodiments any number of stack may be present. The stacks 166 generically refers to the stacks 166-1, 166-2, and 166-3. The stack 166-1 is associated with the stack depth 164-1 (FIG. 2), The stack 166-2 is associated with the stack depth 164-2 (FIG. 2), and the stack 166-3 is associated with the stack depth 164-3 (FIG. 2). Hence, the stack depth 164-1 indicates the number of entries (waiting threads) of the stack 166-1, the stack depth 164-2 indicates the number of entries (waiting threads) of the stack 166-2, and the stack depth 164-3 indicates the number of entries (waiting threads) of the stack 166-3.

Each of the stacks 166-1, 166-2, and 166-3 includes entries for the threads 170 that are waiting on the lock of the object 172 that is associated with the respective stack. The entries in the stacks 166-1, 166-2 and 166-3 may include information regarding the thread, method, and/or class that is waiting to access or waiting to lock the associated object 172.

FIG. 4 depicts a block diagram of an example data structure for a log 162, according to an embodiment of the invention. The log 162 includes records 405, 410, and 415, but in other embodiments any number of records with any appropriate data may be present. Each of the records 405, 410, and 415 is associated with a respective lock of the objects 172. Each of the records 405, 410, and 415 includes a lock identifier field 420, a class file name field 425, a lock depth field 430, a thread stack field 435, a lock wait times field 440, and a threads that exceed wait threshold field 445, but in other embodiments more or fewer fields may be present.

The lock identifier field 420 identifies locks that the threads 170 identified in the thread stack field 435 associated with the class 425 have on the objects 172. The lock identifier field 420 corresponds to the lock identifier field 220 in FIG. 2.

The class file name field 425 identifies or names a class associated with the threads 435 that are waiting on the lock 420. The class identified by the class file name field 425 includes a method and data attributes, and the virtual machine 158 instantiates the threads 170 that are identified in the thread stack field 435 from the class identified by the class field name field 425.

The lock depth field 430 indicates the depth (the number of threads that are waiting on the lock 420 or number of entries in the associated stack 166) of the stack 166 that is stored in the thread stack field 435.

The thread stack field 435 includes entries from the stack 166 that are associated with (are waiting on) the lock 420. For example, the thread stack 435 in the record 405 includes entries from the stack 166-1, the thread stack 435 in the record 410 includes entries from the stack 166-2, and the thread stack 435 in the record 415 includes entries from the stack 166-3. Entries in the thread stack 435 may include information regarding the method that was executing in the thread when the thread began waiting on the lock, the class from which the thread was instantiated, and local variables or data used by the thread.

The lock wait times field 440 indicates the time that the threads 170 indicated in the thread stack field 435 have been waiting on the lock 420. The threads that exceed wait threshold field 445 indicates thread identifiers of the threads whose lock wait time 440 exceeds a threshold.

Figure 5:
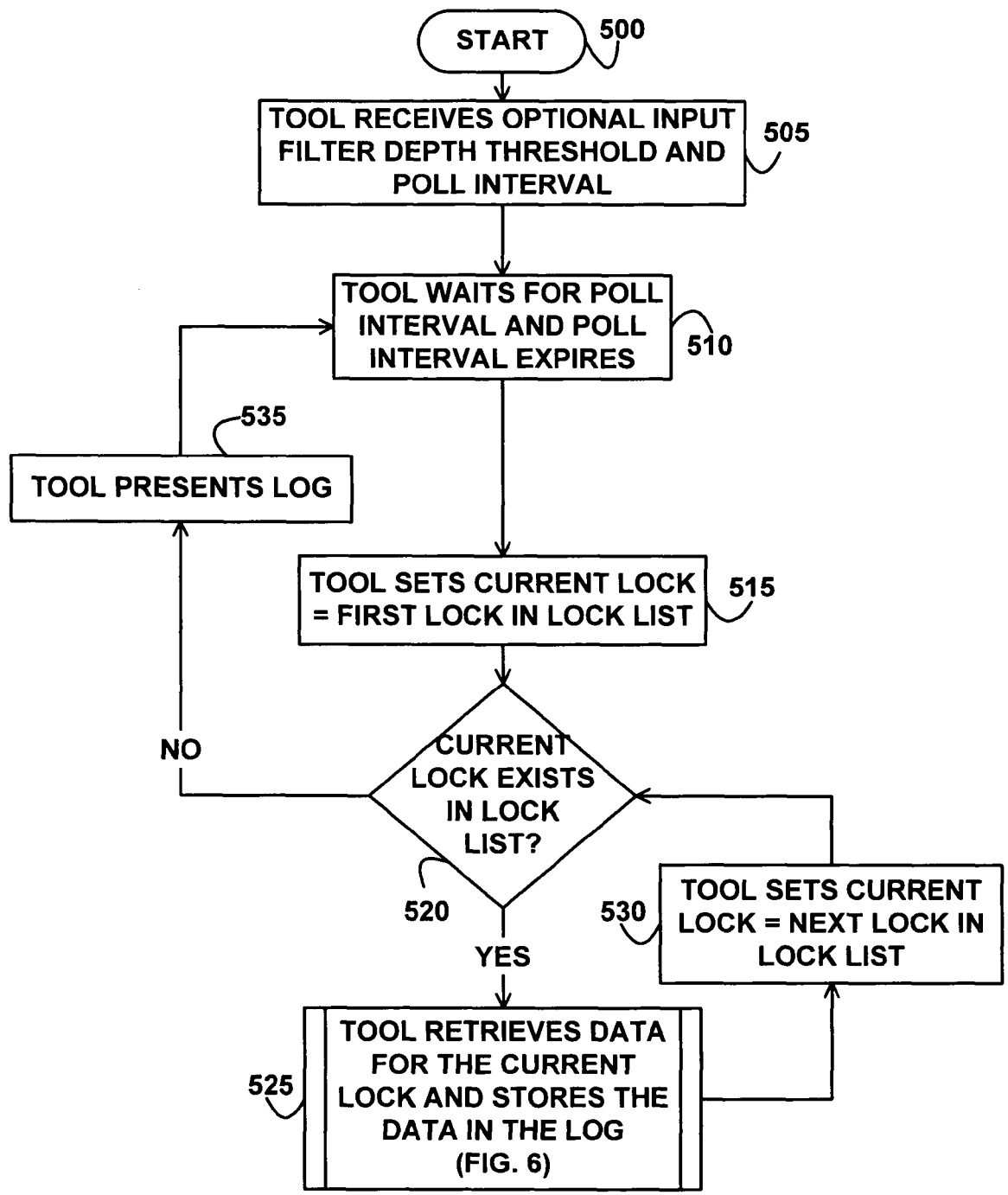
FIG. 5 depicts a flowchart of example processing for polling locks, according to an embodiment of the invention.

FIG. 5 depicts a flowchart of example processing for polling locks, according to an embodiment of the invention. Control begins at block 500. Control then continues to block 505 where the tool 160 receives an optional input filter depth threshold and a poll time interval time period from the invoker of the tool 160 or from any other appropriate source. In another embodiment, the filter depth threshold is a predetermined constant or variable value. Control then continues to block 510 where the tool 160 waits for the poll interval time period and the poll interval time period expires. While the tool 160 waits, the threads 170 execute on the processor 101 via interpretation and/or compilation by the virtual machine 158.

Upon expiration of the poll interval time period, control continues to block 515 where the tool 160 sets the current lock to be the first lock in the lock list 168. Control then continues to block 520 where the tool 160 determines whether the current lock exists in the lock list 168. If the determination at block 520 is true, then control continues to block 525 where the tool 160 processes the lock by retrieving data for the current lock and storing the data in the log 162, as further described below with reference to FIG. 6. Control then continues to block 530 where the tool 160 sets the current lock to be the next lock in the lock list 168. Control then returns to block 520, as previously described above.

If the determination at block 520 is false, then control continues to block 535 where the tool 160 presents the log 162, e.g., by displaying the log via the terminals 121, 122, 123, or 124 connected to the computer system 100 or any other appropriate computer system, e.g., connected via the network 130, or by sending the log 162 to the invoker of the tool 160 or any other appropriate destination. Control then returns to block 510, where the tool 160 waits for another poll interval time period, as previously described above.

Thus, the logic of FIG. 5 acts to repeatedly retrieve and store data every poll interval amount of time.

Figure 6:
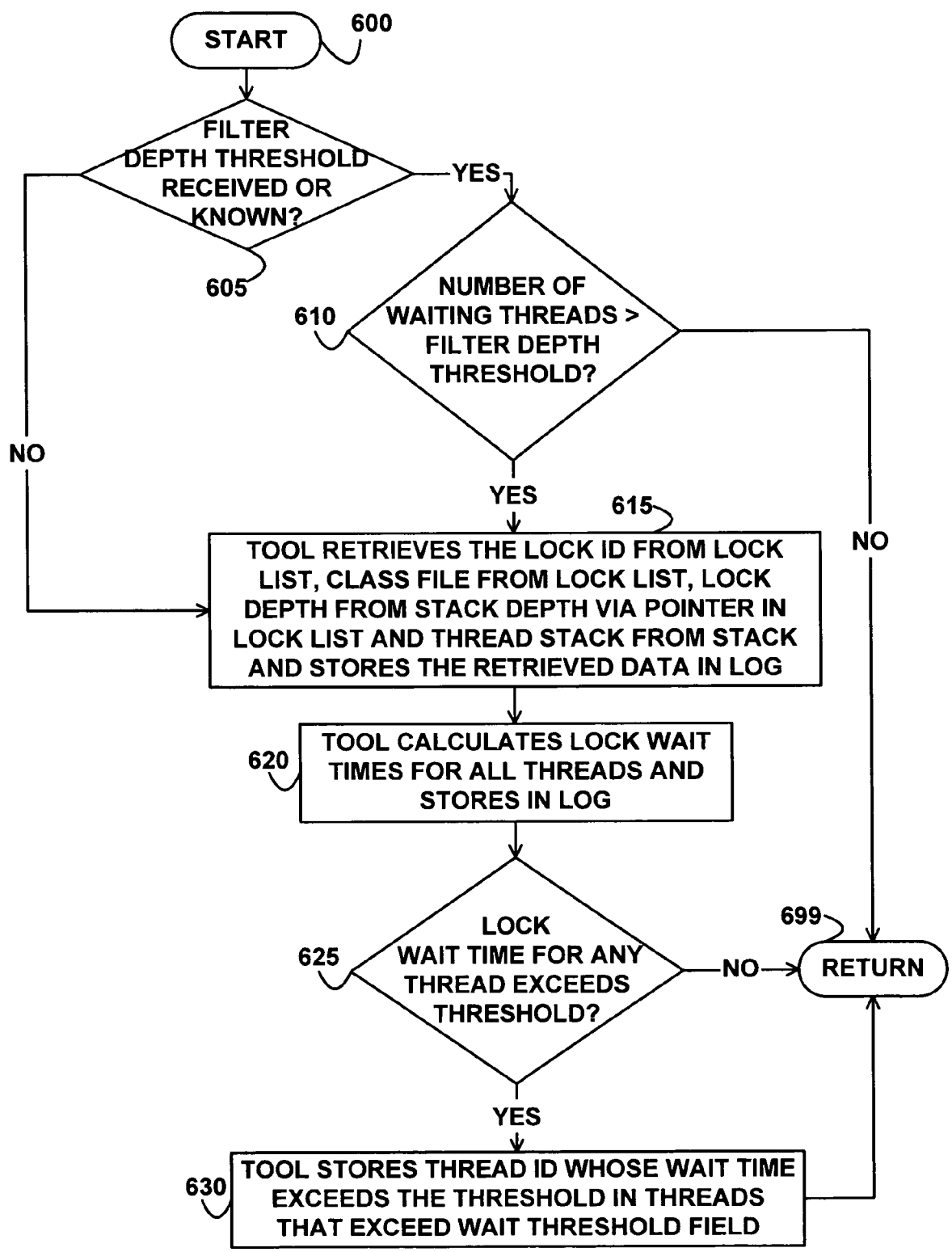
FIG. 6 depicts a flowchart of example processing for logging data for locks, according to an embodiment of the invention.

FIG. 6 depicts a flowchart of example processing for logging data for locks, according to an embodiment of the invention. Control begins at block 600. Control then continues to block 605 where the tool 160 determines whether the optional filter depth threshold has been received or is known and used (optionally received at block 505, as previously described above). If the determination at block 605 is true, the control continues to block 610 where the tool 160 determines whether the number of threads that are waiting on the current lock 220 is greater than the filter depth threshold. The tool 160 makes the determination of block 610 by comparing the stack depth 164 for the current lock 220 to the filter depth threshold.

If the determination at block 610 is true, then the stack depth 164 is greater than the filter depth threshold, so control continues to block 615 where the tool 160 retrieves data regarding the current lock and stores the data in the log 162. The tool 160 stores the lock identifier 220 of the current lock into the lock identifier field 440, stores the class file name 225 of the current lock into the class file name 425, stores the stack depth 164 of the current lock into the lock depth field 430, and stores the stack 166 for the current lock into the thread stack 435. The tool 160 finds the stack depth 164 via the pointer 235 for the current lock in the lock list 168.

Control then continues to block 620 where the tool 160 calculates the lock wait times for all threads that are waiting on the current lock and stores the calculated times in the lock wait times 440. Control then continues to block 625 where the tool 160 determines whether the lock wait time 440 for any thread 170 that is waiting on the current lock exceeds a threshold. If the determination at block 625 is true, then the lock wait time (the time that the thread has been waiting for the lock) for at least one thread 170 does exceed the threshold, so control continues to block 630 where the tool 160 stores an identifier of the thread whose wait time exceeds the threshold in the threads that exceed wait threshold field 445. Control then continues to block 699 where the logic of FIG. 6 returns.

If the determination at block 625 is false, then the lock wait time for any thread 170 does not exceed a threshold, so control continues to block 699 where the logic of FIG. 6 returns.

If the determination at block 610 is false, then control continues to block 699 where the logic of FIG. 6 returns.

If the determination at block 605 is false, then control continues to block 615, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    waiting for expiration of a poll interval; and
    in response to expiration of the poll interval,
        deciding whether a number of a plurality of threads that wait on a plurality of locks on a plurality of objects exceeds a depth threshold,
        if the number of the plurality of threads that wait on the plurality of locks on the plurality of objects exceeds the depth threshold, retrieving data regarding the plurality of locks on the plurality of objects, wherein the data comprises an identifier of the plurality of locks, a name of a class from which the plurality of threads were instantiated, a number of the plurality of threads, and a thread stack, and storing the data in a log,
        if the number of the plurality of threads that wait on the plurality of locks on the plurality of objects does not exceed the depth threshold, refraining from performing the retrieving the data and the storing the data in the log,
        calculating a plurality of lock wait times for the plurality of the threads, wherein the each of the plurality of lock wait times indicates an amount of time that the respective thread has waited on the lock, storing the plurality of lock wait times in the log,
determining whether any of the plurality of lock wait times exceeds a threshold, and
storing an identifier of the thread associated with the lock wait time that exceeds the threshold in the log if any of the plurality of lock wait times exceeds the threshold.

2. The method of claim 1, further comprising:
presenting the log.

3. The method of claim 1, wherein the waiting, retrieving, and storing are performed by a virtual machine that interprets the threads for execution on a processor.

4. A storage medium encoded with instructions, wherein the instructions when executed perform the steps comprise:
waiting for expiration of a poll interval; and
in response to expiration of the poll interval,
deciding whether a number of a plurality of threads that wait on a plurality of locks on a plurality of objects exceeds a depth threshold,
if the number of the plurality of threads that wait on the plurality of locks on the plurality of objects exceeds the depth threshold, retrieving data regarding the plurality of locks on the plurality of objects, wherein the data comprises an identifier of the plurality of locks, a name of a class from which the plurality of threads were instantiated, a number of the plurality of threads, and a thread stock, and storing the data in a log,
if the number of the plurality of threads that wait on the plurality of locks on the plurality of objects does not exceed the depth threshold, refraining from performing the retrieving the data and the storing the data in the log,
calculating a plurality of lock wait times for the plurality of the threads, wherein the each of the plurality of lock wait time indicates an amount of time that the respective thread has waited on the lock, and
storing the plurality of lock wait times in the log,
determining whether any of the plurality of lock wait times exceeds a threshold, and
storing an identifier of the thread associated with the lock wait time that exceeds the threshold in the log if any of the plurality of lock wait times exceeds the threshold.

5. The storage medium of claim 4, further comprising:
presenting the log.

6. The storage medium of claim 4, wherein the waiting, retrieving, storing the data, calculating, and storing the plurality of lock wait times are performed by a virtual machine that interprets the threads for execution on a processor.

7. A computer system comprising a processor communicatively coupled to a storage medium encoded with instructions, wherein the instructions when executed perform the steps comprise:
waiting for expiration of a poll interval; and
in response to expiration of the poll interval,
deciding whether a number of a plurality of threads that wait on a plurality of locks on a plurality of objects exceeds a depth threshold,
if the number of the plurality of threads that wait on the plurality of locks on the plurality of objects exceeds the depth threshold, retrieving data regarding the plurality of locks on the plurality of objects, wherein the data comprises an identifier of the plurality of locks, a name of a class from which the plurality of threads were instantiated, a number of the plurality of threads, and a thread stock, and storing the data in a log,
if the number of the plurality of threads that wait on the plurality of locks on the plurality of objects does not exceed the depth threshold, refraining from performing the retrieving the data and the storing the data in the log,
calculating a plurality of lock wait times for the plurality of the threads, wherein each of the plurality of lock wait times indicates an amount of time that the respective thread has waited on the lock, and
storing the plurality of lock wait times in the log,
determining whether any of the plurality of lock wait times exceeds a threshold, and
storing an identifier of the thread associated with the lock wait time that exceeds the threshold in the log if any of the plurality of lock wait times exceeds the threshold.

8. A method for configuring a computer, comprising:
configuring the computer to wait for expiration of a poll interval; and
configuring the computer to, in response to expiration of the poll interval,
decide whether a number of the plurality of threads that wait on a plurality of locks on a plurality of objects exceeds a depth threshold,
if the number of the plurality of threads that wait on the plurality of locks on the plurality of objects exceeds the depth threshold, retrieve data regarding the plurality of locks on the plurality of objects, wherein the data comprises an identifier of the plurality of locks, a name of a class from which the plurality of threads were instantiated, a number of the plurality of threads, and a thread stack, and store the data in a log,
refrain from the retrieve of the data and the store of the data in the log if the number of the plurality of threads that wait on the plurality of locks on the plurality of objects does not exceed the depth threshold,
calculate a plurality of lock wait times for the plurality of the threads, wherein the each of the plurality of lock wait time indicates an amount of time that the respective thread has waited on the lock, and
store the plurality of lock wait times in the log,
determine whether any of the plurality of lock wait times exceeds a threshold, and
store an identifier of the thread associated with the lock wait time that exceeds the threshold in the log if the determining is true.

9. The method of claim 8, further comprising:
configuring the computer to present the log.

10. The method of claim 8, wherein the waiting, retrieving, storing the data, calculating, and storing the plurality of lock wait times are performed by a virtual machine that interprets the threads for execution on a processor.

* * * * *